United States Patent
Capozzella et al.

(10) Patent No.: US 10,766,566 B2
(45) Date of Patent: Sep. 8, 2020

(54) PROPULSION UNIT FOR AN ELECTRIC PEDAL-ASSISTED CYCLE AND PEDAL-ASSISTED CYCLE THEREOF

(71) Applicant: PIAGGIO & C. S.p.A., Pontedera, Pisa (IT)

(72) Inventors: Paolo Capozzella, Pisa (IT); Luca Carmignani, Pisa (IT); Luca Nuti, Pisa (IT); Giorgio Prosperini, Pisa (IT)

(73) Assignee: PIAGGIO & C. S.p.A, Pontedera, Pisa (IT)

( * ) Notice: Subject to any disclaimer, the term of this patent is extended or adjusted under 35 U.S.C. 154(b) by 197 days.

(21) Appl. No.: 15/522,799

(22) PCT Filed: Oct. 27, 2015

(86) PCT No.: PCT/IB2015/058279
§ 371 (c)(1),
(2) Date: Apr. 28, 2017

(87) PCT Pub. No.: WO2016/067199
PCT Pub. Date: May 6, 2016

(65) Prior Publication Data
US 2017/0334512 A1    Nov. 23, 2017

(30) Foreign Application Priority Data
Oct. 31, 2014   (IT) .............................. PD2014A0291

(51) Int. Cl.
*B62M 6/45*        (2010.01)
*B62M 6/55*        (2010.01)
(Continued)

(52) U.S. Cl.
CPC ................ *B62M 6/45* (2013.01); *B62M 6/55* (2013.01); *H02K 7/08* (2013.01); *H02K 7/116* (2013.01);
(Continued)

(58) Field of Classification Search
CPC . B62M 6/45; B62M 6/55; B62M 6/40; B62M 6/50; B62M 6/80; B62M 6/90; B62M 9/04; B62M 11/145
See application file for complete search history.

(56) References Cited

U.S. PATENT DOCUMENTS 5,691,584 A * 11/1997 Toida .................. B60K 7/0007
                                                          180/65.51
6,012,538 A *  1/2000 Sonobe ................... B62M 6/45
                                                          180/206.3
(Continued)

FOREIGN PATENT DOCUMENTS

DE         2009045447    *  6/2010
DE      102011077903 A1   12/2012
EP         0832816 A1      4/1998

*Primary Examiner* — Anne Marie M Boehler
(74) *Attorney, Agent, or Firm* — Arent Fox LLP

(57) ABSTRACT

Propulsion unit for an electric, pedal-assisted bicycle comprising an electric machine having a stator and a rotor, rotatable about a motor axis, said rotor being operatively connected to a crank pin, defining a crank axis, mechanically connected to pedals, and coaxial with the motor axis, wherein the rotor is coaxial and external with respect to the stator so as radially enclose the rotor. The propulsion unit comprises at least one electronic unit for operating and controlling the functioning of the electric machine, and at least a pair of housings that define a containment space which houses the electric machine and at least partially the crank pin.

19 Claims, 7 Drawing Sheets

(51) Int. Cl.
  *H02K 11/33*   (2016.01)
  *H02K 7/08*    (2006.01)
  *H02K 7/116*   (2006.01)
  *H02K 7/14*    (2006.01)
  *H02K 9/00*    (2006.01)
  *B62M 6/90*    (2010.01)

(52) U.S. Cl.
  CPC ............. *H02K 7/14* (2013.01); *H02K 9/00* (2013.01); *H02K 11/33* (2016.01); *B62M 6/90* (2013.01)

(56) References Cited

U.S. PATENT DOCUMENTS

| | | | |
|---|---|---|---|
| 6,104,112 A | 8/2000 | Vanjani | |
| 6,321,863 B1 * | 11/2001 | Vanjani | B60K 7/0007 180/206.5 |
| 7,550,894 B2 * | 6/2009 | Hino | H02K 21/028 310/191 |
| 8,651,993 B1 * | 2/2014 | Watarai | B62M 6/55 475/205 |
| 2006/0090943 A1 * | 5/2006 | Perng | B62M 6/55 180/206.4 |

\* cited by examiner

PROPULSION UNIT FOR AN ELECTRIC PEDAL-ASSISTED CYCLE AND PEDAL-ASSISTED CYCLE THEREOF

CROSS-REFERENCE TO RELATED APPLICATIONS

This application is a National Stage entry of International Application No. PCT/IB2015/058279, filed Oct. 27, 2015, which claims priority to Italian Patent Application No. PD2014A000291, filed Oct. 31, 2014. The disclosures of these priority applications are incorporated in their entirety herein by reference.

Background

This invention relates to a propulsion unit for a pedal-assisted cycle, called "EPAC" (Electric Pedal Assisted Cycle) and a related pedal-assisted cycle comprising said propulsion unit.

In particular, it relates to a cycle having a propulsion unit that provides, according to appropriate control schemes, assistance to the pedal stroke that the rider generates in the use of the means through the pedals.

Summary

As is known, the key success factors for this type of bicycle solutions are compactness, lightness, practicality of use, attractive appearance and, not least, reasonable cost.

PRESENTATION OF THE INVENTION

To solve the above-mentioned problems, several solutions have been adopted in the art bicycles equipped with a propulsion unit arranged in the vicinity of the crank axis, so as to provide torque to aid the user, when needed.

However, such solutions of the known art involve some disadvantages.

In fact, the known solutions are rather bulky and heavy since the propulsion unit includes various components including the motor unit provided with stator and rotor, the battery pack and the means of transmission of the movement of the motor unit to the crank axis.

It is clear that one must fund the right compromise between the need for drive torque/motor autonomy, which would involve the adoption of a larger motor unit and heavier battery packs, and light weight, compactness, streamlining and low cost that users expect from this type of pedal-assisted vehicle.

There are solutions in the art of motor units that adopt even sophisticated transmission solutions such as, for example, planetary gears that connect the motor to the crank, in order to limit as much as possible the overall dimensions of the propulsion unit.

These solutions, although sophisticated and not bulky, are rather expensive and heavy.

Therefore, there is a need to solve the drawbacks and limitations mentioned in reference to the prior art.

This need is met by a rear propulsion unit according to claim 1.

DESCRIPTION OF THE DRAWINGS

Further characteristics and advantages of this invention will be more understandable from the following description of its preferred and non-limiting examples of embodiments, wherein.

The members, or parts of members, in common between the embodiments described below will be indicated with the same reference numbers.

DETAILED DESCRIPTION

Figure 1:
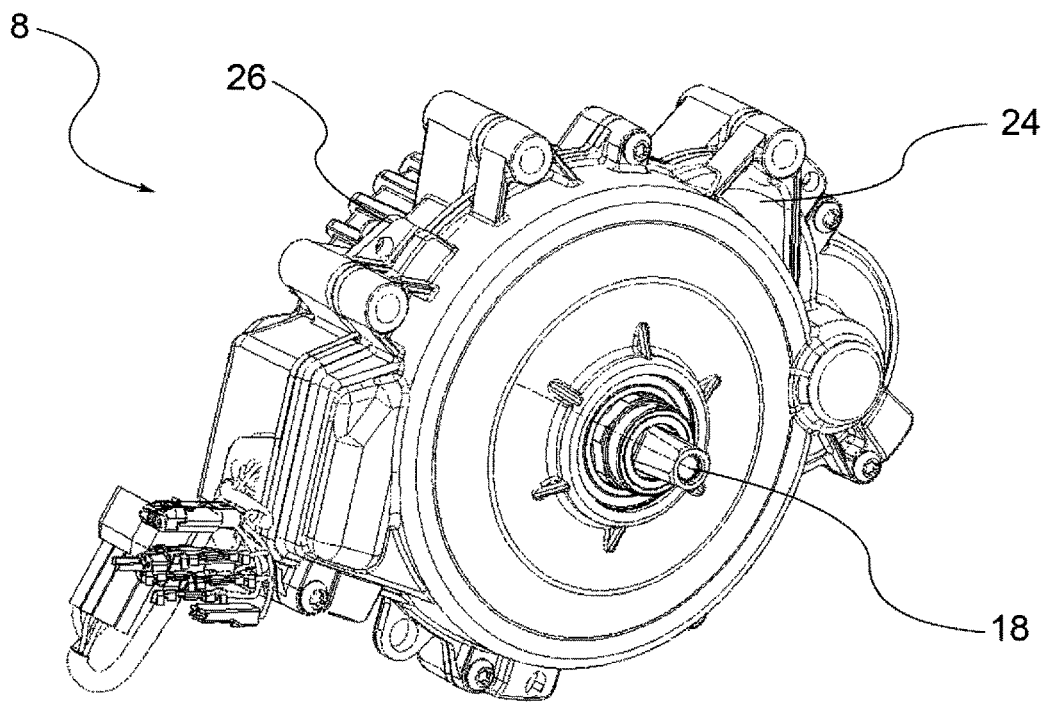
FIG. 1 is a perspective view of a propulsion unit according to an embodiment of this invention.
Figure 2:
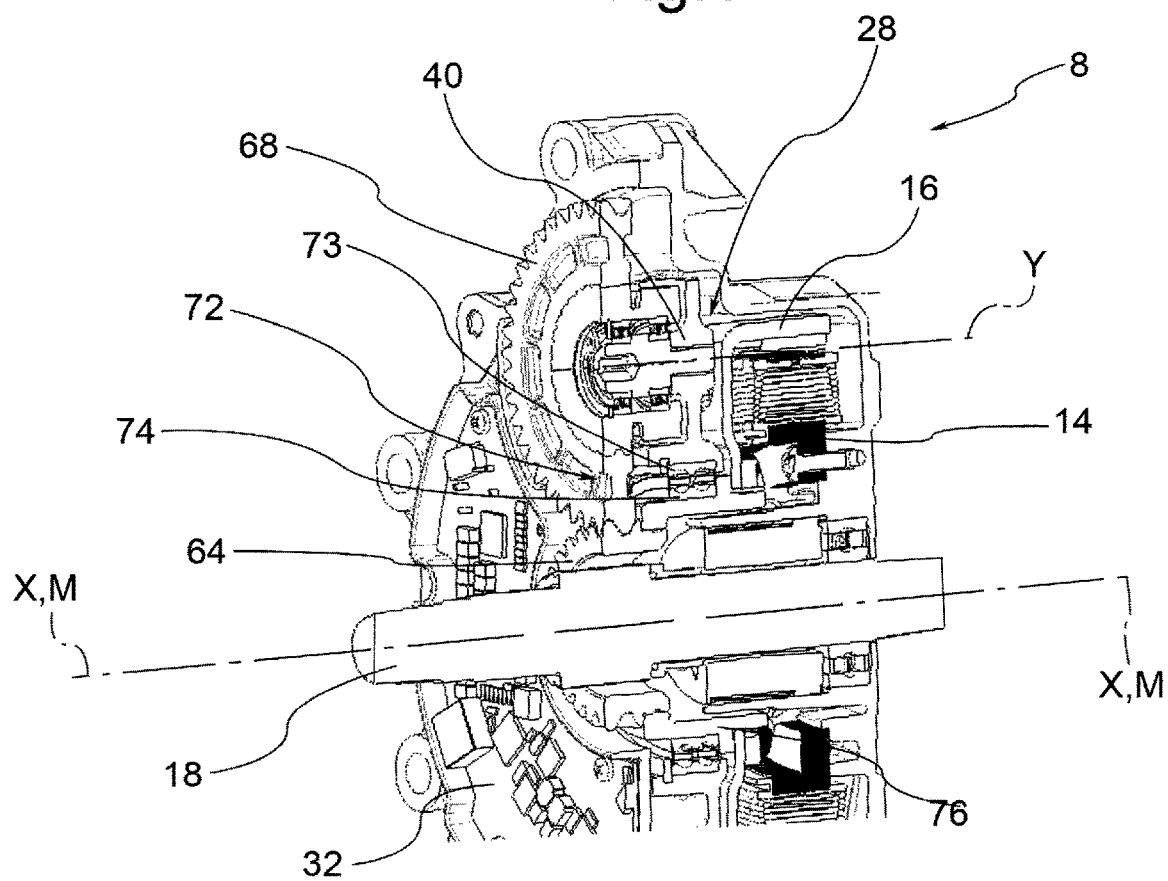
FIGS. 2-4 are section views, from different angles, of the propulsion unit of FIG. 1.

With reference to the above figures, reference number 4 globally indicates an overall schematic view of a bicycle comprising a propulsion unit 8 according to this invention.

This invention relates in particular to a pedal-assisted cycle, commonly called "EPAC" (Electric Pedal Assisted Cycle).

For the purposes of this invention, the type of bicycle frame is irrelevant, meaning also cycles with more than two wheels, both front and rear.

The propulsion unit 8 comprises an electric machine 12 having a stator 14 and a rotor 16, rotatable about a motor axis M-M, said rotor 16 being operatively connected to a crank pin 18, defining a crank axis X-X mechanically connected to pedals 20.

The crank axis X-X is coaxial with the motor axis M-M.

The rotor 16 is coaxial and external to the stator so as to radially enclose the rotor 16; radial direction means a direction perpendicular to the axis of the crank X-X and incident with it.

In this way the rotor 16 encloses and radially surrounds the stator 14.

The propulsion unit 8 comprises at least one pair of housings 24,26 defining a containment space 28 which houses the electric machine 12 and at least partially the crank axis X-X.

Preferably, the housings 24,26 are made of a thermally conductive material, such as metal.

The propulsion unit 8 comprises at least one electronic unit 32 for operating and controlling the functioning of the electric machine 12. The unit 32 is for example resting on a corresponding support plate 34.

The propulsion unit 8 also comprises transmission means 36 of the movement from the rotor 16 to the crank axis X-X, said transmission means 36 being arranged in an asymmetrical position overall and decentralised from the crank axis X-X, so as to be outside the projection of the rotor 16 on a projection plane perpendicular to the crank axis X-X.

The electronic unit 32 is contained and is supported inside said containment space 28.

Preferably, the electronic unit 32 is positioned so as to fall inside the projection of the rotor 16 on a projection plane perpendicular to the crank axis X-X.

According to an embodiment, the electronic unit 32 is positioned on the opposite side to the drive means 36 overall, in relation to the crank axis X-X.

For example, the electronic unit 32 is generally "C"-shaped and is arranged around the crank axis X-X.

According to an embodiment, the propulsion unit 8 comprises an intermediate support element 40, of the fixed type, which rotatably supports said rotor 16 and which supports the electronic unit 32 in a fixed manner; the intermediate support element 40 is also contained, within the containment space 28.

For example, the rotor 16 and the electronic unit 32 are positioned on axially opposite sides in relation to said intermediate support element 40, along the crank axis X-X.

In this way, the intermediate support element 40 realises an element not only of support but also of axial separation between the rotor 16 and the stator 14 of the electric machine 12, on the one hand, and the electronic unit 32 on the other.

Said intermediate support element 40 is arranged around the crank axis X-X and fixed in relation thereto.

Preferably, the intermediate support element 40 receives and conveys the heat generated by both the electric machine 12 and the electronic unit. This heat received in a substantially axial direction by the intermediate support element 40 is, by the latter, radially dissipated outwards, i.e., away from the crank axis X-X.

In fact, the intermediate support element 40 is in contact with at least one of said housings 24,26 so as, through these, to dissipate the heat radially outwards from the propulsion unit 8.

Preferably, the intermediate support element 40 is made of a thermally conductive material, such as metal.

According to an embodiment, the propulsion unit 8 comprises at least one cylindrical element 44 which mechanically connects said intermediate support element 40 to the electronic unit 32, said cylindrical element 44 being a thermal conductor which makes it possible to extract the heat from the electronic unit 36 to the intermediate support element 40 and from the latter to the outside of the housings 24,26.

According to an embodiment, at least one of said cylindrical elements 44 is provided with an oval cross-section with respect to a cross-section plane perpendicular to a main extension axis of said cylindrical element.

The oval cross-section is the one that, for equal overall dimensions, ensures a greater heat exchange capacity if, for example, compared to a circular section.

According to an embodiment, the electronic unit 32 is provided with at least an electric cable 48 and at least one related conduit 52; the conduit 52 is fixed to the electronic unit 32 by means of at least one attachment means 56, such as a screw.

The conduit 52 and/or attachment fixing means 56 are thermal conductors for dissipating the heat from the electronic unit itself.

As mentioned above, the propulsion unit 8 comprises transmission means 36 to transmit the movement from the rotor 16 to the crank pin 18.

According to an embodiment, the transmission means 36 comprise a first transmission stage 60 having a first input gear 64, integral in rotation with the rotor 16 and coaxial thereto, and a first output gear 68 rotatable about a first axis Y-Y parallel and offset in relation to the rotation axis X-X. The first input and output gears 64,68 mesh with each other.

According to an embodiment, the first input gear 64 is rotatably supported by the intermediate support element.

For example, the intermediate support element 40 comprises and delimits a hole 70 which houses a bearing 72; the bearing 72 comprises a first ring 73 fixed and fitted onto the wall of the intermediate support element 40 that delimits the hole 70 and a second ring 74 movable and integral in rotation with a portion of said first input gear 64. In this way, thanks to the interposition of the bearing 72, the intermediate support element 40 rotatably supports the intermediate support element 40; moreover, according to an embodiment, the first input gear 64 is integral in rotation to the rotor 16, thanks to a cup element 76. For example, the cup element 76 comprises a ring on which is planted with interference the second ring 74 of the bearing 72.

The propulsion unit 8 comprises a second transmission stage 80 having a second input gear 84, integral in rotation with the first output gear 68 and coaxial therewith, and a second output gear 88, which meshes with the second input gear 84 and is rotatable integrally with a second shaft 92 defining a second axis or axis of reference W-W offset and parallel to the rotation axis X-X and to the first axis Y-Y.

For example, the second input gear 84 is connected coaxially to the first output gear 68 of the first transmission stage 60 by means of a grooved profile.

Figure 3:
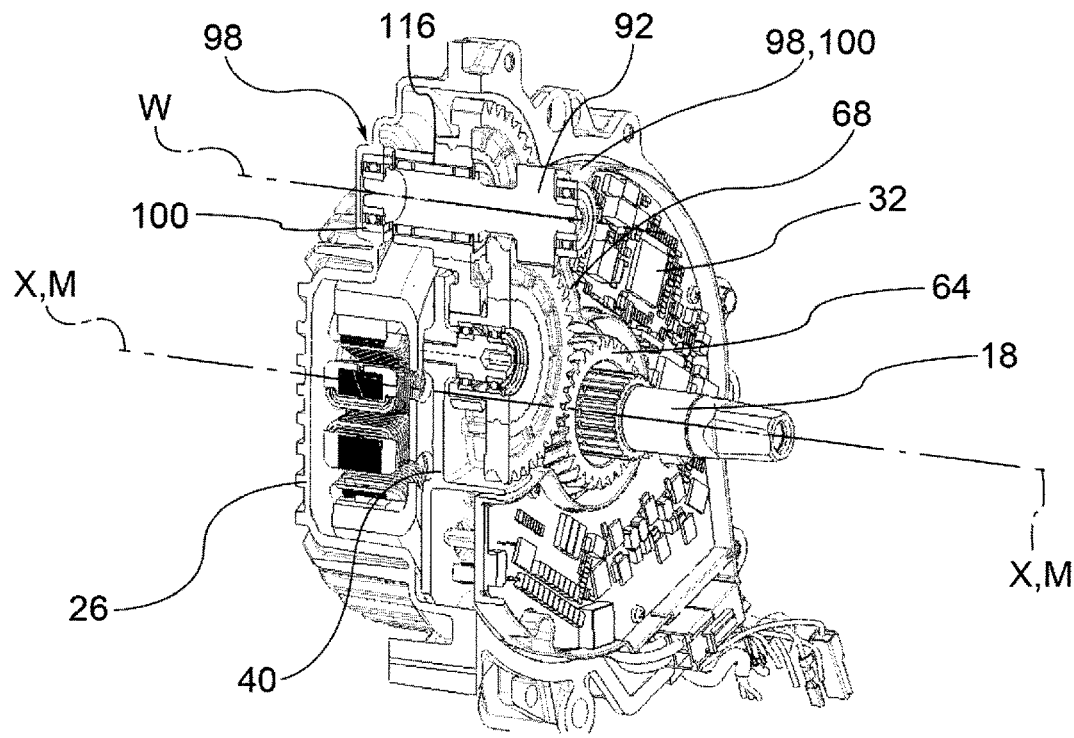
Figure 4:
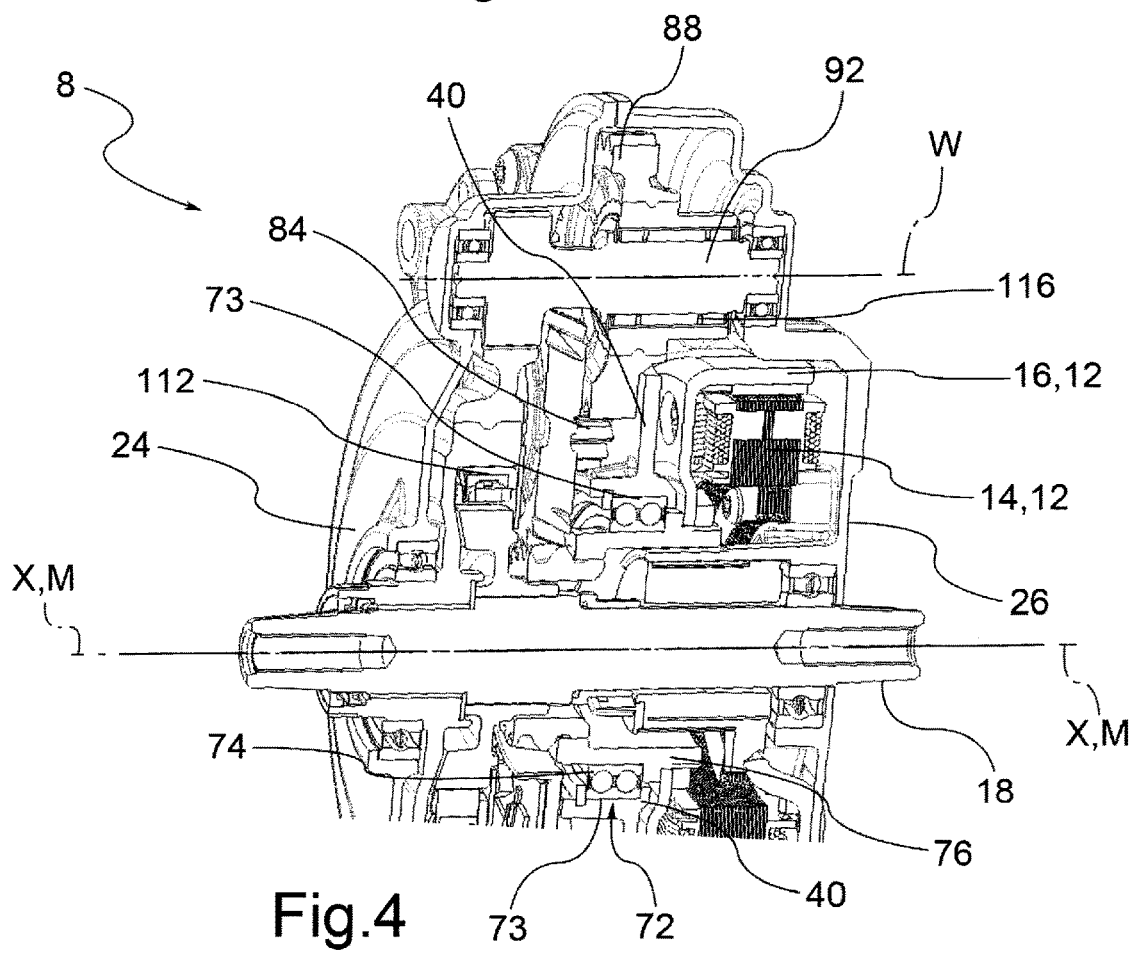
Figure 5:
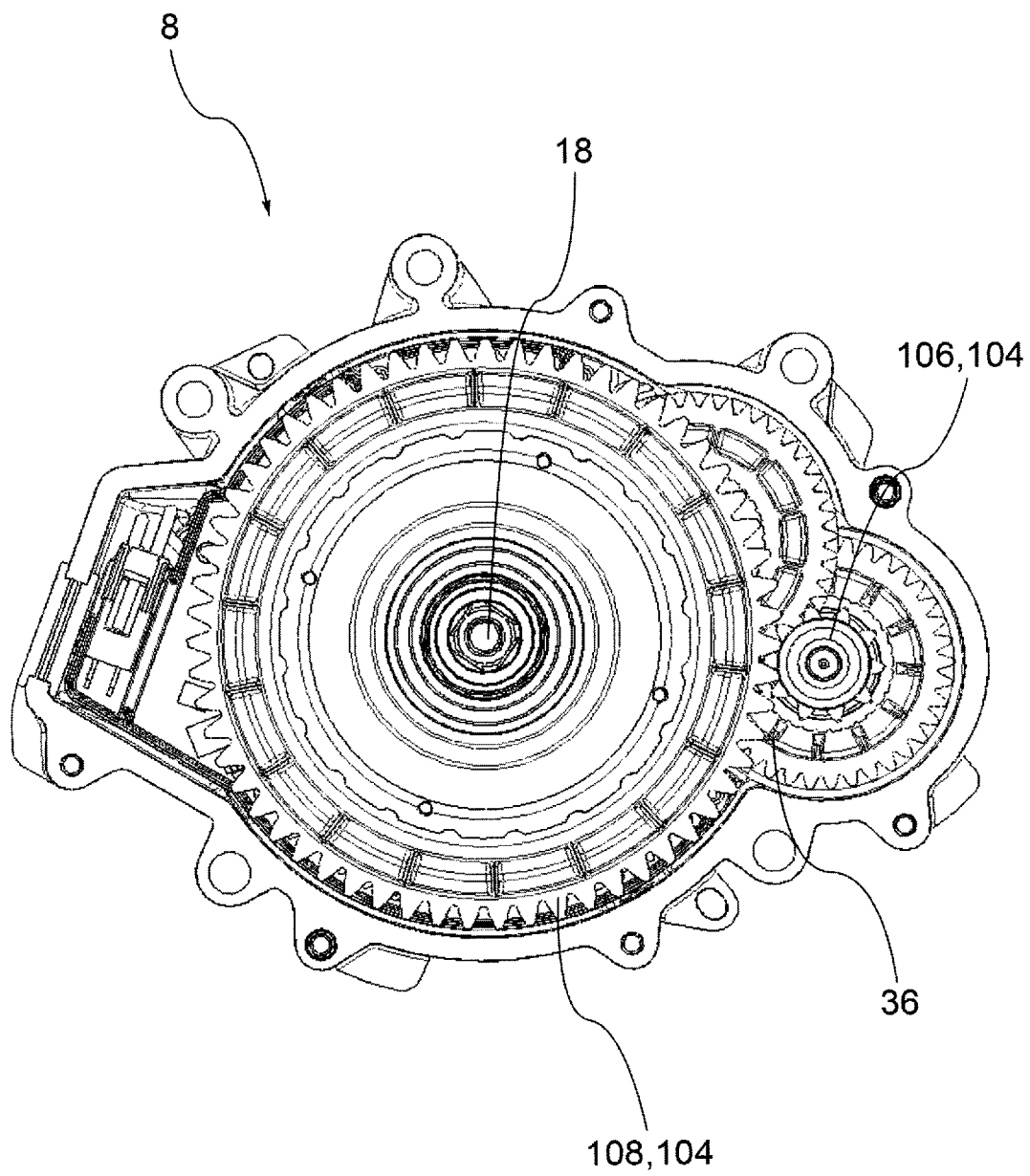
FIG. 5 is a side view of a propulsion unit in which a side cover or housing has been removed.
Figure 6:
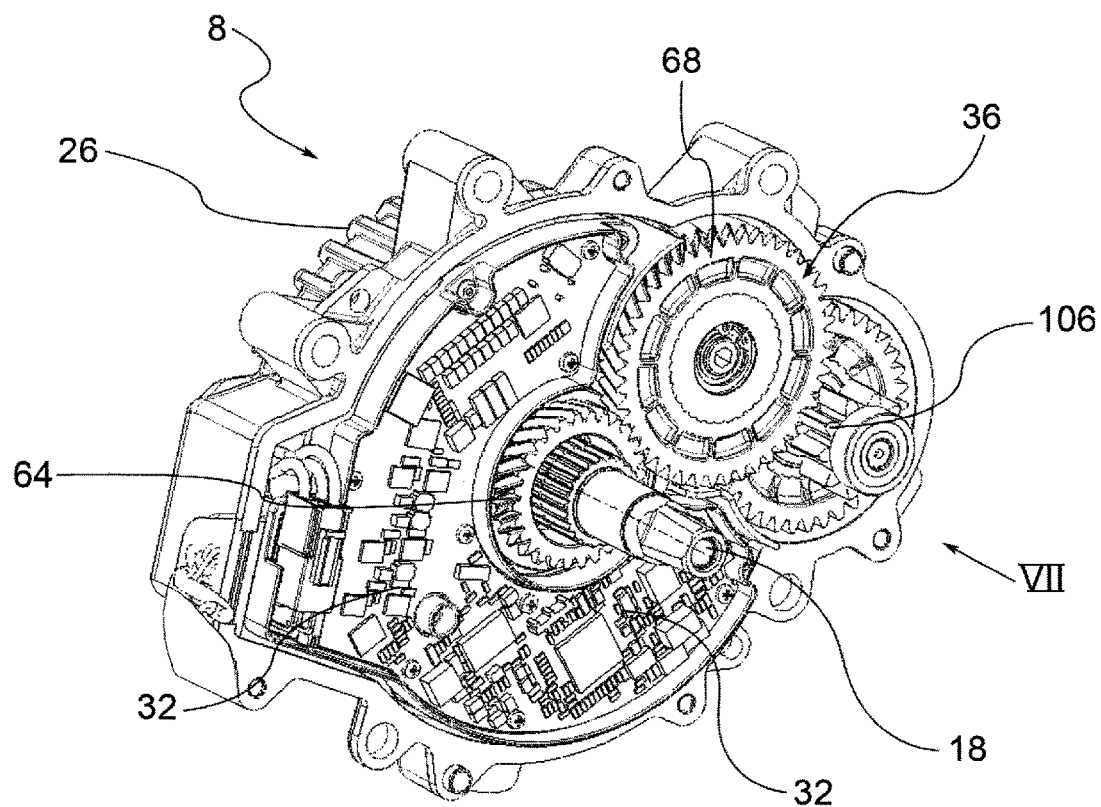
FIG. 6 is a perspective view of a propulsion unit in which a side cover has been removed.
Figure 7:
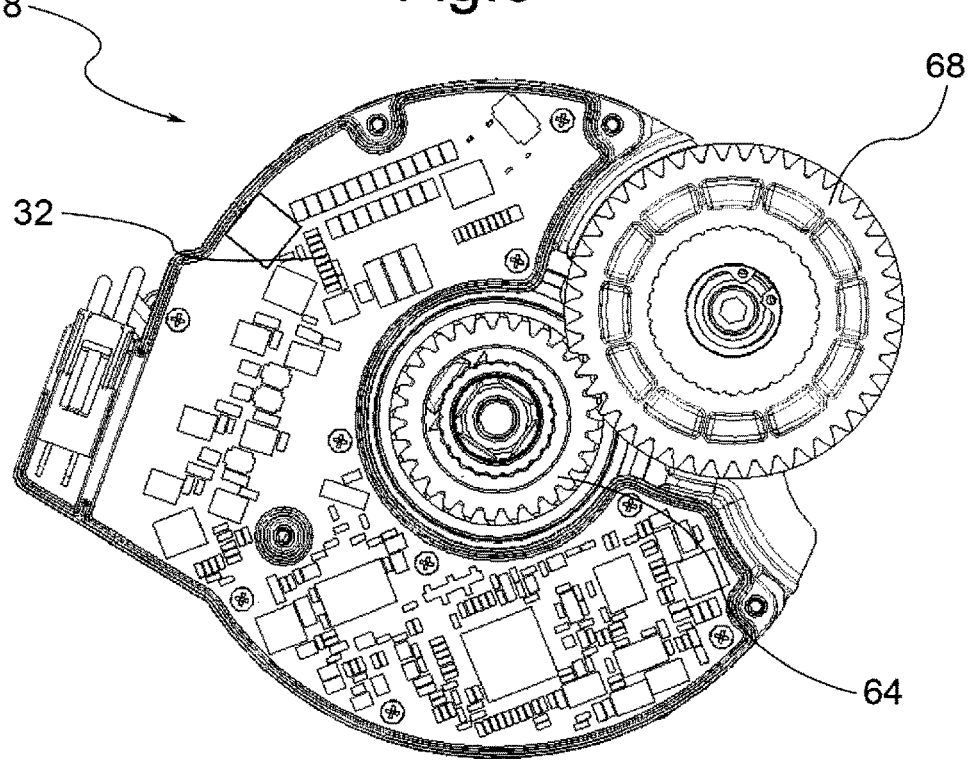
FIG. 7 is a front view from the side of the propulsion unit of FIG. 6, from the side of the arrow VII of FIG. 6.
Figure 8:
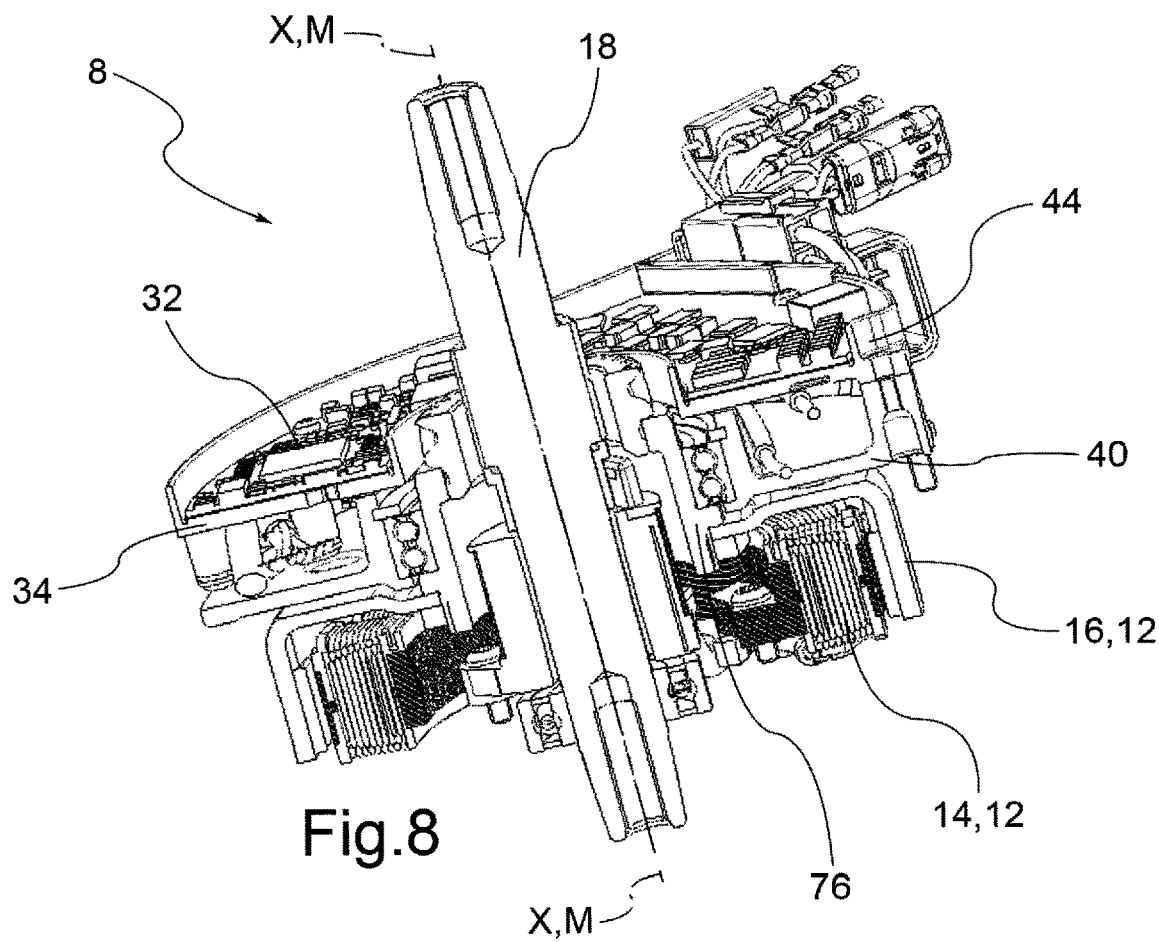
FIG. 8 is a perspective view in section of a propulsion unit according to the invention, in which several elements are omitted.
Figure 9:
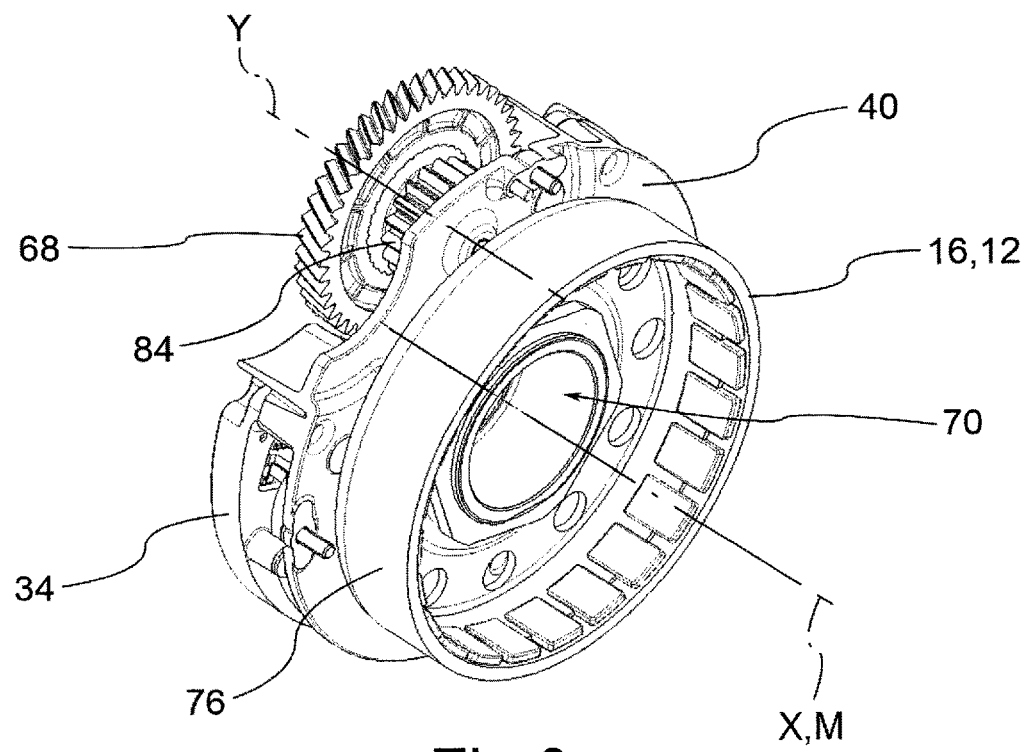
FIG. 9 is a perspective view of a propulsion unit, partially assembled, of this invention.
Figure 10:
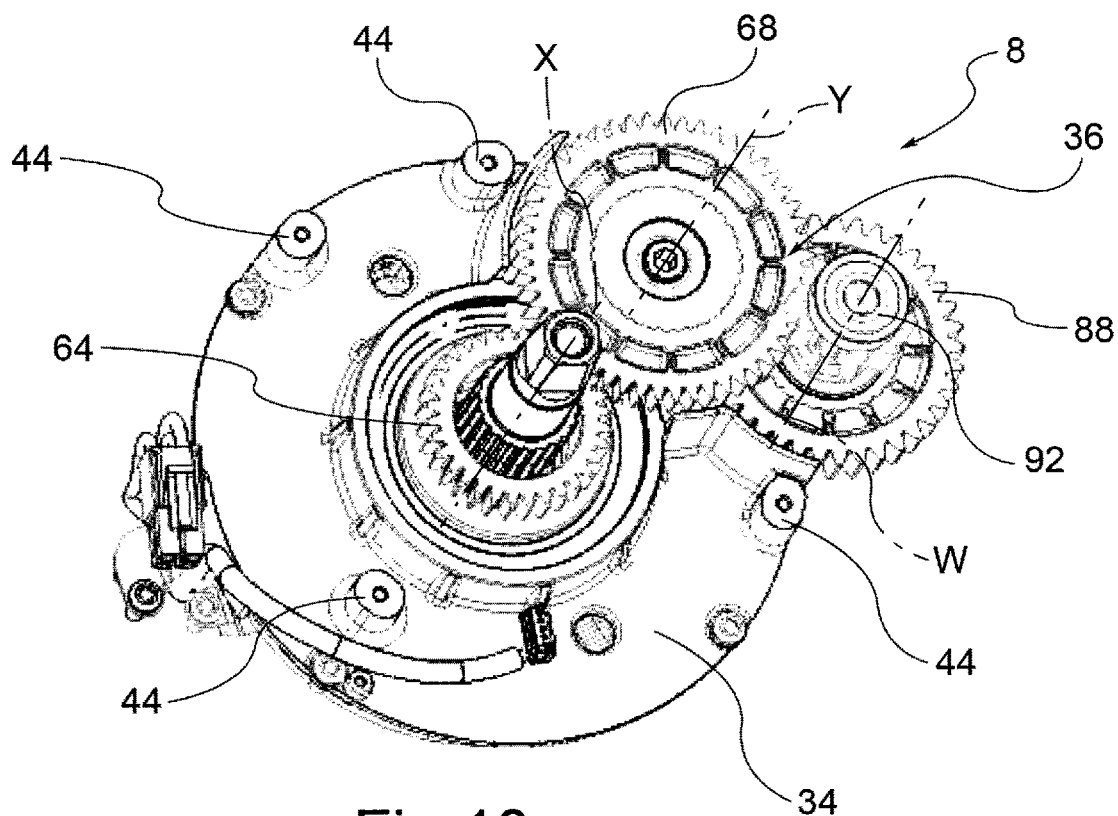
FIGS. 10-12 are perspective views of components of the propulsion unit according to this invention.
Figure 11:
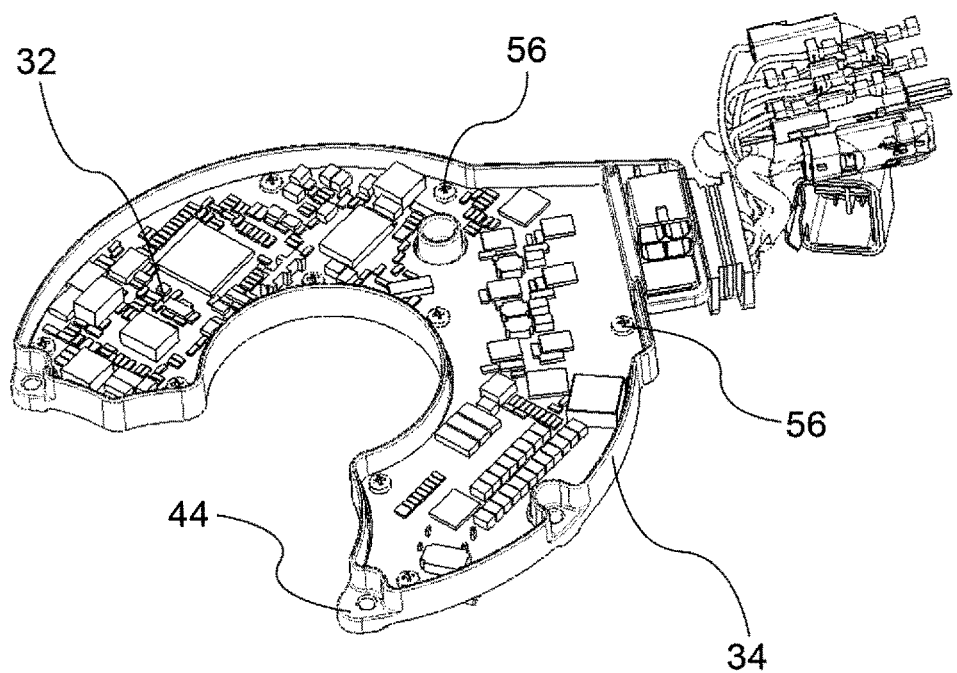
Figure 12:
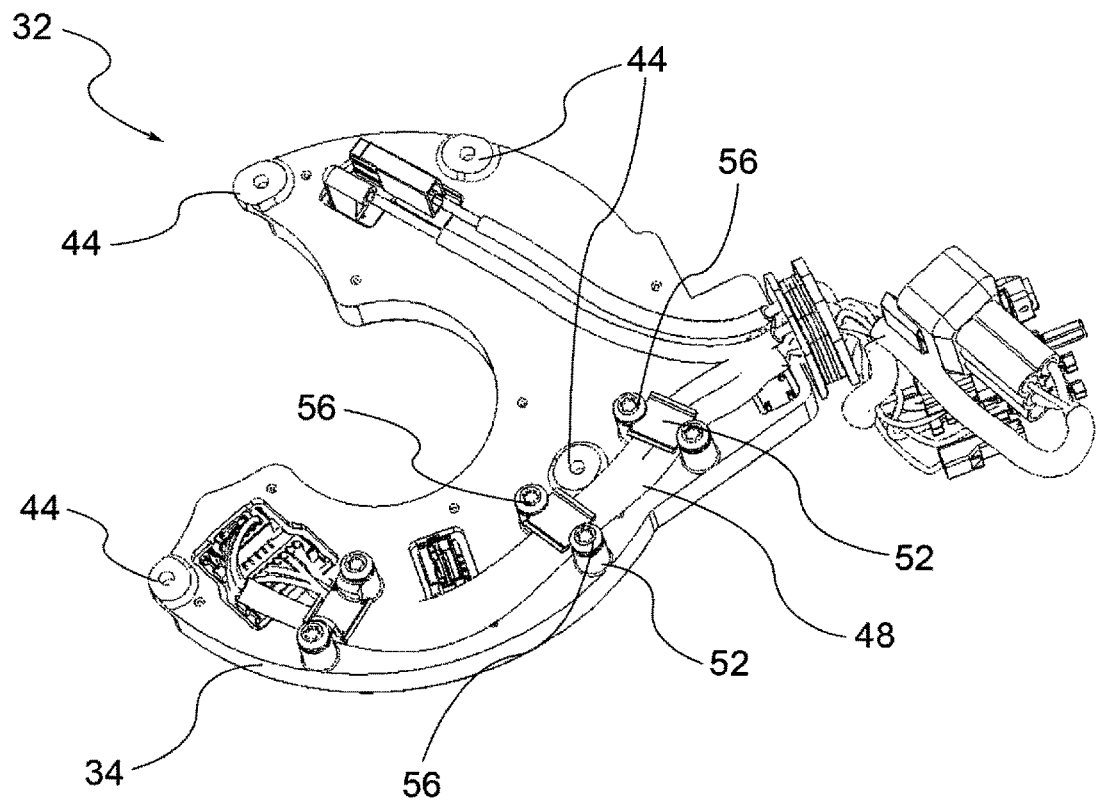
Figure 13:
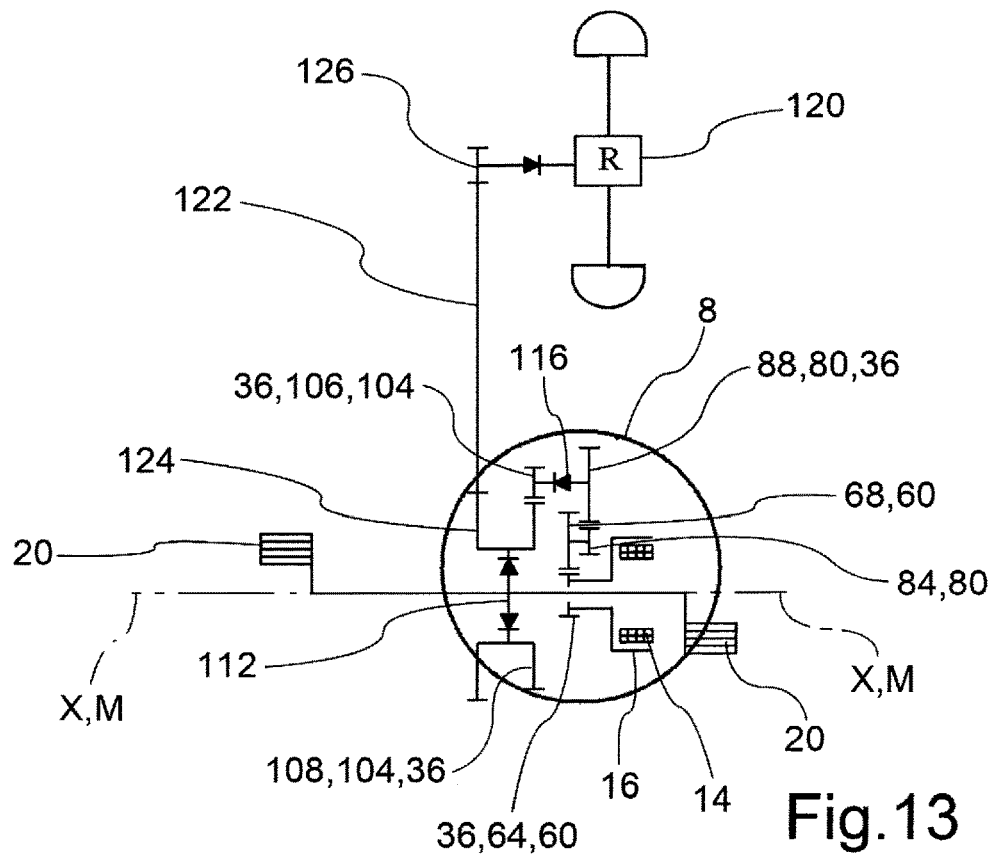
FIG. 13 is a schematic view of the kinematic transmission of the propulsion unit according to this invention, applied to a bicycle.

For example, the housings 24,26 define seats 98 which house the support bearings 100 for said second shaft 92 (FIG. 3).

The propulsion unit 8 comprises a third transmission stage 104 having a third input gear 106, integral in rotation with the second output gear 88 and coaxial therewith, and a third output gear 108 which meshes with the third input gear 106 and which transmits the power onto the rotation axis X-X realising the pedal-assist.

The propulsion unit 8 comprises a first free wheel 112 mounted between the third output gear 108 and the crank pin 18, coaxially to the crank axis X-X, so as to prevent the dragging of the propulsion unit 8 when placing the crank in counter rotation (push thrust contrary with respect to the direction of travel) or when the vehicle is moving in a direction opposite to the forward direction.

In this way, it is avoided that the user encounters resistance, due to the drag of the propulsion unit 8, both in counter thrusts and in phases of manual movement, in reverse, of the bicycle.

Preferably, the propulsion unit 8 comprises a second free wheel 116 mounted between the second shaft 92 and the second output gear 88, so as to release the torque transmission to the second output gear 88 to prevent the user from dragging the mechanisms of the propulsion unit 8 in rotation when this does not provide pedal-assist.

For example, said second free wheel 116 is configured so as to make the second output gear 88 integral with the second shaft 92 when the speed of rotation of the third stage transmission 104 is greater than or equal to that of the second shaft 92.

For example, the second free wheel 116 is configured so that, if the speed of rotation of the second shaft 92 is higher than that of the second output gear 88, the second free wheel 116 makes it possible to advance, thanks to the disengagement of the cylinders, thus preventing the rider from having to also place the propulsion unit in rotation.

As seen, the propulsion unit 8 according to this invention is mounted on a bicycle 4; the crank pin 18 is kinematically connected to a drive wheel 120 of the bicycle 4, for example through a chain transmission.

Moreover, a direction of advancement F of the bicycle 4 having been defined, the propulsion unit 8 is associated and oriented in relation to a bicycle frame so that the electronic unit 32 is positioned at least partially on the side of the direction of advancement F.

In this way, the portion of housing 24,26 that surrounds the electronic unit is directly and completely invested by the frontal air flow that meets the vehicle in motion, optimising the cooling of the electronic unit 32 and thus of the propulsion unit 8.

We will now describe the operation of the propulsion unit for cycle according to this invention.

In particular, the electronic unit 32, based on the logic provided, detecting the boundary conditions, activates the electric machine 12 so as to provide the power assistance which is added to that generated by the rider. The control logic that manages the pedal-assist depends, without going into the details, on operating variables from time to time detected by special sensors deployed on the EPAC, such as, for example, the slope, the speed, the torque required, etc.) and any regulatory restrictions that apply to the category of the vehicle (normally they may regard the maximum speed beyond which the assistance must cease and the maximum assistance power of the electric motor).

When the intervention conditions are reached, the electric machine is activated, i.e., also in this case without going into detail, according to a suitable logic, a certain current is passed through the stator windings 14.

Following the passage of current in the stator 14, the rotor 16 enters in rotation providing the pedal-assist, i.e., applying torque and thus power on the crank pin 18. The electricity required to operate the entire system is contained in the form of chemical energy in a battery pack, mounted on-board the vehicle.

Going into more detail of its mechanical operation, in its motion, the rotor 16 places in rotation the first input gear 64 fitted to it which, together with the first output gear 68, constitutes the pair of gears of the first transmission stage 60.

The second input gear 84, connected coaxially to the first output gear 68 for example by means of a grooved profile, transmits the motion to the second output gear 88.

The second input gear 84 and the first output gear wheel rotate integrally around the first axis Y-Y parallel and axially offset with respect to the axis of rotation X-X or crank axis.

The second output gear 88 is fitted on the second shaft 92 which consequently enters the rotation.

The second shaft 92 places in rotation the third input gear 106 of the third transmission stage 104 which together with the third output gear 108 form the pair of the third transmission stage 104.

The third output gear 108 ultimately transmits the power of the crank axis X-X realising the pedal-assist.

In the propulsion unit 8 are present has two free wheels 112,116.

As seen, the first free wheel 112 mounted between the third output gear 108 and the crank pin 18, coaxially to the crank axis X-X, so as to prevent the dragging of the propulsion unit 8 when placing the crank, or pedals 20, in counter rotation or when the vehicle is moving in a direction opposite to the forward direction.

In this way, it is avoided that the user encounters resistance, due to the drag of the propulsion unit 8, both in counter thrusts and in phases of manual movement, in reverse, of the bicycle.

The free-wheel function can be obtained by means of various technical solutions, for example through the use of latches, and is preferably mounted coaxially to the crank axis X-X. Due to the action of the latches, the crank pin 18 may outstrip the third output gear 108 which therefore remains disengaged: so, dragging the propulsion unit 8 is prevented in the case of a counter thrust or movement of the bicycle in reverse.

Moreover, as seen, the propulsion unit 8 comprises a second free wheel 116 mounted between the second shaft 92 and the second output gear 88, so as to release the torque transmission to the second output gear 88 to prevent the user from dragging the mechanisms of the propulsion unit 8 in rotation when this does not provide pedal-assist.

For example, said second free wheel 116 is configured so as to make the second output gear 88 integral with the second shaft 92 when the speed of rotation of the third stage transmission 104 is greater than or equal to that of the second shaft 92.

For example, the second free wheel 116 is configured so that, if the speed of rotation of the second shaft 92 is higher than that of the second output gear 88, the second free wheel 116 makes it possible to advance, thanks to the disengagement of the cylinders, thus preventing the rider from having to also place the propulsion unit in rotation.

In this way, if the action of the user in forward travel is such as to ensure a speed of rotation of the pedals higher than that imposed by the propulsion unit 8, the second automatically free wheel 116 disengages the propulsion unit 8 which otherwise would function as a brake on the driving action imparted by the user. If, instead, the action imposed on the pedals 20 by the user is such as to generate a speed of rotation of the pedals lower than that imposed by the propulsion unit 8, then the second free wheel 116 allows the transmission of torque from the propulsion unit 8 to the pedals. In this situation, it is the user that supplies a lower torque/power than that generated by the propulsion unit 8; in any case, the torque imparted by the user on the pedals 20 is never disengaged but is always transmitted to the crank pin 18 and by, for example, a chain transmission 122, to the drive wheel. In other words, the torque action imparted by the user is added, on the crank pin 18, to the torque action delivered by the propulsion unit, which functions as an element of assistance to the action of the user.

The chain transmission 122 may comprise a crown 124 integral in rotation with the crank pin 18 and a pinion 126: the crown 124 and the pinion 126 are toothed so as to mesh appropriately with the chain links of the chain transmission 122.

Obviously the operation described above is, in turn, subject to the operating/intervention logic of the electric machine 12 implemented by the electronic unit 32 based on a plurality of operating parameters.

As can be appreciated from the description, the propulsion unit according to the invention allows overcoming the drawbacks presented in the prior art.

In particular, this invention, realised to provide drive power (powertrain unit) to the pedal-assisted bicycle (EPAC), is extremely compact, since its implementation has been provided in the central hub or crank axis.

In fact, to obtain a high compactness in the radial direction, unit was designed in such a way as to have the axis of outgoing torque coaxial with the pedaling axis.

The goal of compactness was pursued by providing the minimum possible number of references to bring the torque exercised by the propulsion unit on the crank axis. In fact, always from the point of view of obtaining the most compact solution possible in all directions, the layout of the gears (triangle formed by the axes of the toothed wheels) was optimised.

Furthermore, the use of the aforementioned pairs of gears allows avoiding the adoption of expensive planetary assemblies while still achieving the purpose of compactness for the transmission of motion from the motor to the crank pin 18.

In addition, the architecture described, which involves the insertion of the electronic unit inside the housing of the motor unit allows for further compactness as well as placing the unit itself in a safe and protected position.

This compactness is further obtained thanks to the "C" configuration of the unit around the crank axis and opposite the transmission: in this way, it is possible, on the one hand, to house the electronic unit in a single compact component, which falls within the projection of the rotor on the projection plane perpendicular to the axis of the crank and, on the other, to have the transmission arranged in a position that is still close to the crank axis. Moreover, as seen, the electronic unit can be more efficiently cooled due to the flow of air that invests the bicycle from the front during travel and, on the other, the transmission means are arranged directly on the side of the rear wheel.

The electronic unit can advantageously be inserted in the projection of the rotor on the projection plane perpendicular to the axis of the crank: in this way, one achieves a significant compaction of the propulsion unit.

In addition, the rear and raised arrangement of the transmission means contributes to:
- centralising the bicycle's centre of gravity, improving dynamic behaviour and stability,
- increasing the so-called ground clearance of the vehicle, allowing for easier overcoming of obstacles such as speed bumps.

The coaxiality between the crank axis and motor axis allows also optimising the layout of the rotor and stator elements of the electric machine.

In this case, we opted for a solution with external rotor and internal stator. The use of a rotor external to the stator allows, for equal overall dimensions, optimising the torque exerted by the propulsion unit since it increases the arm exerted by the electromotive force generated by the rotor.

So, it also achieves the purpose of optimising the drive torque with equal overall dimensions.

Furthermore, given a direction of advancement of the bicycle, the propulsion unit is preferably associated and oriented in relation to the bicycle frame in such a way that the electronic unit is positioned at least partially on the side of the direction of advancement. In this way, it is possible to benefit from the cooling due to the air that hits the housings that enclose the electronic unit itself during the advancement motion.

The propulsion unit according to this invention also employs techniques for a more efficient heat dissipation: this requirement is due to the fact that if, on the one hand, the arrangement of the electronic unit inside the housing improves the compactness of the propulsion unit, on the other hand, it increases the risk of overheating the electronic unit because it is found in an enclosed position and not subject to direct heat exchange with the outside air. Moreover the extreme compactness of the propulsion unit contributes to making the dissipation of the heat of the rotor/stator unit more critical.

For this reason, this invention provides techniques at both the topological level and the level of mechanical fasteners in order to optimise the cooling not only of the electronic unit but also of the motor.

In fact, at the topological level, the preferential positioning of the unit requires that the unit be oriented in the direction of travel so as to benefit from cooling due to the air in front of the bicycle.

Furthermore, the rotor is radially external with respect to the stator so that the corresponding portion of the housing that covers it, may be hit by an increased flow of cooling air during the travel of the bicycle.

Furthermore, as seen, the cylindrical elements and related conduits are designed so as to favour thermal exchange in order to evacuate the heat produced by the electronic unit.

In addition, the intermediate element, which is fixed, is able to receive the heat flow coming from the motor and convey it towards the outside of the unit through the housings.

In other words, the intermediate element is an element that receives the heat coming from both the electronic unit and the engine and transmits it outside so as to dissipate it.

According to an embodiment, the intermediate element receives the heat coming axially, from opposite sides, respectively from the side of the electronic unit and the side of the motor and sends it radially towards the outside through said housings.

A person skilled in the art, in order to satisfy contingent and specific needs, may make numerous modifications and variations to the propulsion unit described above, all however contained within the scope of the invention as defined by the following claims.

The invention claimed is:

1. A propulsion unit for an electric pedal-assisted cycle (EPAC) comprising:
   an electric machine having a stator and a rotor, the rotor being rotatable about a motor axis a crank pin defining a crank axis being coaxial with the motor axis,
   wherein the rotor is coaxial and external to the stator, the rotor radially enclosing the stator, and
   wherein the propulsion unit comprises:
     at least one electronic unit for operating and controlling a functioning of the electric machine,
     at least a pair of housings defining a containment space which houses the electric machine and at least partially houses the crank pin,
     a transmittor of a movement from the rotor to the crank axis, the transmittor of the movement being arranged in an asymmetrical position overall and decentralised from the crank axis so as to be at least in part outside a projection of the rotor on a projection plane perpendicular to the crank axis,
     the at least one electronic unit is positioned so as to fall inside a projection of the rotor on the projection plane perpendicular to the crank axis, and
     the at least one electronic unit being shaped as a 'C' around the crank axis and being arranged to partially surround the transmittor of the movement;
   wherein the transmittor of the movement comprises a first transmission stage having a first input gear, integral in rotation with the rotor and coaxial thereto, and a first output gear rotatable about a first axis parallel and offset in relation to a rotation axis;
   wherein the transmittor of the movement comprises a second transmission stage having a second input gear, integral in rotation with the first output gear and coaxial therewith, and a second output gear, which meshes with the second input gear and is integral in rotation with a second shaft defining a second axis offset and parallel to the rotation axis and to the first axis.

2. The propulsion unit according to claim 1, wherein the electronic unit is contained and is supported inside said containment space.

3. The propulsion unit according to claim 1, wherein the electronic unit is positioned on an opposite side to the transmittor of the movement overall, in relation to the crank axis.

4. The propulsion unit according to claim 1, wherein the propulsion unit comprises an intermediate support element contained within the containment space, wherein the intermediate support element rotatably supports the rotor and the intermediate support element supports the electronic unit in a fixed manner.

5. The propulsion unit according to claim 4, wherein the rotor and the electronic unit are positioned on axially opposite sides in relation to said intermediate support element, along the crank axis.

6. The propulsion unit according to claim 4, wherein the intermediate support element is arranged around the crank axis and fixed in relation to the crank axis.

7. The propulsion unit according to claim 4, wherein the propulsion unit comprises at least one cylindrical element which mechanically connects the intermediate support element to the electronic unit, said cylindrical element being a thermal conductor for extracting heat from the electronic unit to provide heat to the intermediate support element and for extracting heat from the intermediate support element to provide heat to outside of the pair of housings.

8. The propulsion unit according to claim 7, wherein the at least one cylindrical element is provided with an oval cross-section with respect to a cross-section plane perpendicular to a main extension axis of the at least one cylindrical element.

9. The propulsion unit according to claim 1, wherein the electronic unit is provided with at least one electric cable and at least one corresponding conduit, the conduit being attached to the electronic unit by at least one attacher, and wherein at least one of: the conduit and an attacher of the at least one attacher is a thermal conductor in order to dissipate the heat from said electronic unit.

10. The propulsion unit according to claim 4, wherein said first input gear is rotatably supported by the intermediate support element.

11. The propulsion unit according to claim 1, wherein the second input gear is connected coaxially to the first output gear of the first transmission stage by a grooved profile.

12. The propulsion unit according to claim 1, wherein said housings define seats which house support bearings for said second shaft.

13. The propulsion unit according to claim 1, wherein the transmittor of the movement comprises a third transmission stage having a third input gear, integral in rotation with the second output gear and coaxial therewith, and a third output gear which meshes with the third input gear and which transmits the power onto the rotation axis or crank axis realizing the pedal-assist.

14. The propulsion unit according to claim 13, wherein the propulsion unit comprises a first free wheel mounted between the third output gear and the crank pin, coaxially to the crank axis, so as to prevent the dragging of the propulsion unit when placing the crank in counter rotation or when the cycle is moving in a direction opposite to a forward direction.

15. The propulsion unit according to claim 1, wherein the propulsion unit comprises a second free wheel mounted between the second shaft and the second output gear, so as to release a torque transmission to the second output gear to prevent a user from dragging mechanisms of the propulsion unit in rotation when the pedal-assist is not realized.

16. The propulsion unit according to claim 15, wherein said second free wheel is configured so as to make the second output gear integral with the second shaft when a speed of rotation of a third transmission stage is greater than or equal to a speed of rotation of the second shaft.

17. The propulsion unit according to claim 15, wherein the propulsion unit comprises at least one cylindrical element which mechanically connects an intermediate support element to the electronic unit, wherein said second free wheel is configured so that, when a speed of rotation of the second shaft is greater than a speed of the second output gear, the at least one cylindrical element disengages such that the electric machine advances using the second free wheel without requiring a rider to place the electric machine in rotation.

18. A bicycle comprising the propulsion unit according to claim 1, wherein the crank pin is kinematically connected to a drive wheel of the bicycle.

19. The bicycle according to claim 18, wherein a direction of advancement of the bicycle is defined, and the propulsion unit is associated and oriented in relation to a frame of the bicycle so that the electronic unit of the propulsion unit is positioned at least partially on a side of the direction of advancement of the bicycle.

* * * * *